(12) United States Patent
Charnesky et al.

(10) Patent No.: US 8,485,296 B2
(45) Date of Patent: Jul. 16, 2013

(54) JAMMING RESISTANT AERO LOUVER

(75) Inventors: Scott P. Charnesky, Birmingham, MI (US); Kerry A. Charnesky, Birmingham, MI (US); Michael J. Sigelko, Rochester Hills, MI (US); Bradley K. Rogers, Washington, MI (US); Kyle C. Smith, Hazel Park, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 272 days.

(21) Appl. No.: 12/884,354

(22) Filed: Sep. 17, 2010

(65) Prior Publication Data

US 2012/0067655 A1    Mar. 22, 2012

(51) Int. Cl.
 *B60K 11/08*  (2006.01)
 *F01P 7/10*  (2006.01)

(52) U.S. Cl.
 USPC ........................................... 180/68.1; 165/98

(58) Field of Classification Search
 USPC .................. 180/68.1, 68.2, 68.3, 68.4, 68.6
 See application file for complete search history.

(56) References Cited

U.S. PATENT DOCUMENTS

| | | | | |
|---|---|---|---|---|
| 1,390,724 A | * | 9/1921 | Rumens | 236/35.3 |
| 1,525,653 A | * | 2/1925 | Maloy | 160/237 |
| 1,528,575 A | * | 3/1925 | Schill | 165/41 |
| 1,712,519 A | * | 5/1929 | Pipenhagen | 180/68.1 |
| 1,742,598 A | * | 1/1930 | Holt | 180/68.1 |
| 1,943,239 A | * | 1/1934 | Johannsen | 165/98 |
| 2,276,279 A | * | 3/1942 | Asklund | 180/68.1 |
| 4,165,118 A | * | 8/1979 | Jensen | 296/50 |
| 8,025,045 B2 | * | 9/2011 | Pettersson et al. | 123/568.12 |
| 2010/0243351 A1 | * | 9/2010 | Sakai | 180/68.1 |
| 2011/0187153 A1 | | 8/2011 | Boutaris et al. | |
| 2012/0110909 A1 | | 5/2012 | Crane et al. | |

FOREIGN PATENT DOCUMENTS

| | | | |
|---|---|---|---|
| DE | 19652397 A1 | | 6/1998 |
| DE | 10306158 A1 | | 8/2004 |
| DE | 102008046313 A1 | | 3/2010 |
| DE | 102008049228 A1 | | 6/2010 |
| EP | 206299 A1 | * | 12/1986 |
| FR | 2 655 370 | * | 6/1989 |
| JP | 2011-195039 | * | 6/2011 |
| WO | 2011009212 A1 | | 1/2011 |

* cited by examiner

*Primary Examiner* — J. Allen Shriver, II
*Assistant Examiner* — Bridget Avery
(74) *Attorney, Agent, or Firm* — Quinn Law Group, PLLC

(57) ABSTRACT

A louver for a vehicle includes a panel having a central portion and a first outer edge portion. A hinge interconnects the central portion and the first outer edge portion. The louver rotates about a rotation axis in a first direction from an open position to a closed position. The hinge bends to allow the first outer edge portion to move relative to the central portion to reduce an effective moment arm resisting rotational movement of the louver when the louver is bound.

19 Claims, 3 Drawing Sheets

JAMMING RESISTANT AERO LOUVER

TECHNICAL FIELD

The invention generally relates to a louver for controlling a flow of air through an inlet in a body of a vehicle.

BACKGROUND

Vehicles include a body, which typically defines an inlet disposed at a front end of the body. For Example, the inlet may allow air to flow into an engine compartment of the body. The air flows through the inlet and across a radiator to cool an engine coolant, which in turn cools an engine of the vehicle.

In order to increase a fuel efficiency of the vehicle, some vehicles have incorporated active louvers adjacent to the inlet to regulate the flow of air through the grille. The louvers move between an open position and a closed position. The open position allows the flow of air through the inlet, and the closed position blocks the flow of air through the inlet. An actuator may move the louvers between the open position and the closed position under pre-determined operating conditions to optimize the fuel efficiency of the vehicle.

Under certain conditions, dirt and mud may become adhered to the louvers. The dirt and mud may jam and/or bind the louvers, thereby hindering and/or preventing rotation of the louvers between the open position and the closed position.

SUMMARY

A vehicle is provided. The vehicle includes a body that defines an inlet. A louver is coupled to the body. The louver is rotatably moveable about a rotation axis between an open position and a closed position. The louver allows airflow through the inlet when in the open position. The louver blocks airflow through the inlet when in the closed position. The louver includes a central portion and a first outer edge portion. The first outer edge portion is disposed adjacent the central portion. The louver rotates about the rotation axis in a first direction when moving from the closed position into the open position. The louver includes a hinge disposed between the central portion and the first outer edge portion. The hinge is configured for bending movement to allow the first outer edge portion to move relative to the central portion when moving from the closed position to the open position.

A louver for selectively opening and closing an inlet of a vehicle body is also provided. The louver includes a panel extending along a longitudinal axis. The panel includes a central portion, a first outer edge portion and a second outer edge portion. The first outer edge portion and the second outer edge portion are disposed opposite each other across the central portion. The panel includes an anti-stick coating disposed on an outer surface of the panel.

Accordingly, the hinge allows the louver to bend or flex at a point between the rotation axis of the louver and the first outer edge portion when the first outer edge portion is bound. Allowing the louver to bend at the hinge reduces an effective resistance moment arm in the louver when the louver is bound, thereby making it easier for an actuator to move, i.e., un-bind, the louver. The anti-stick coating minimizes the amount of debris that sticks to the louver, thereby reducing the resistance moment arm making it easier for the actuator to move the louver.

The above features and advantages and other features and advantages of the present invention are readily apparent from the following detailed description of the best modes for carrying out the invention when taken in connection with the accompanying drawings.

DETAILED DESCRIPTION

Figure 1:
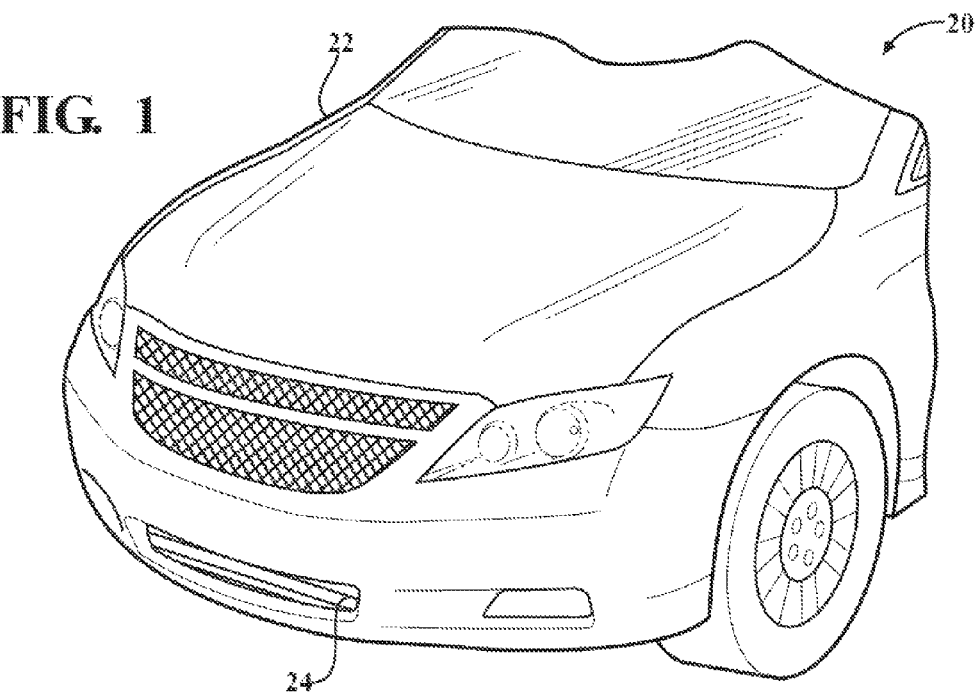
FIG. 1 is a schematic perspective view of a vehicle.
Figure 2:
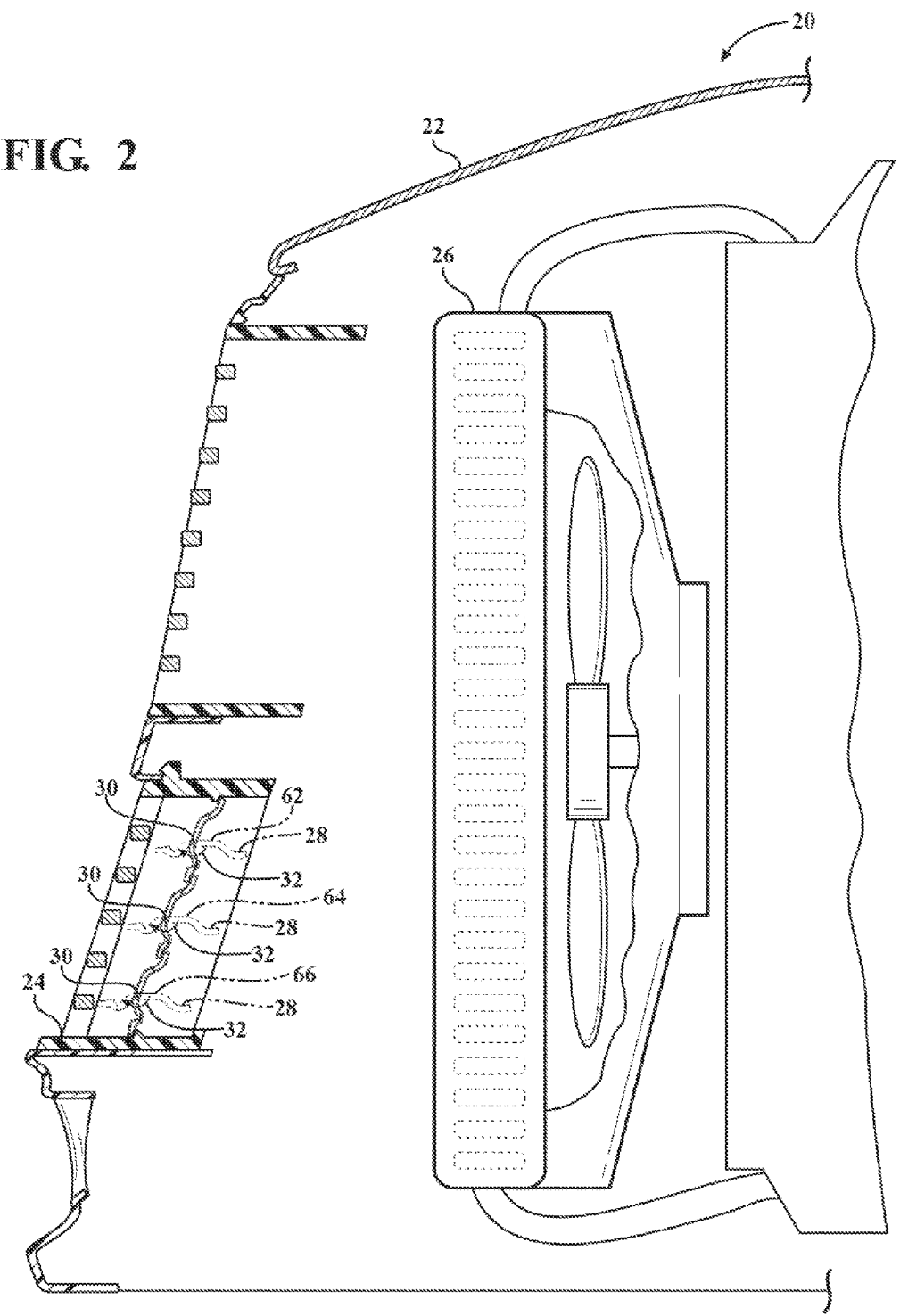
FIG. 2 is a fragmentary schematic cross sectional view of the vehicle.

Referring to the Figures, wherein like numerals indicate like parts throughout the several views, a vehicle is shown generally at 20. Referring to FIGS. 1 and 2, the vehicle 20 includes a body 22 that defines an inlet 24. The inlet 24 is configured for allowing air to pass therethrough. The inlet 24 may be positioned at a front of the body 22, and disposed forward of a radiator 26 and/or air conditioning condenser. However, it should be appreciated that the inlet 24 may be disposed at any location on the body 22. The inlet 24 may be sized and/or shaped in any suitable manner capable of meeting any airflow and/or aesthetic design considerations. Additionally, the inlet 24 may include a plurality of inlets 24 disposed adjacent each other, including but not limited to the openings in a front grille of the vehicle 20.

Figure 3:
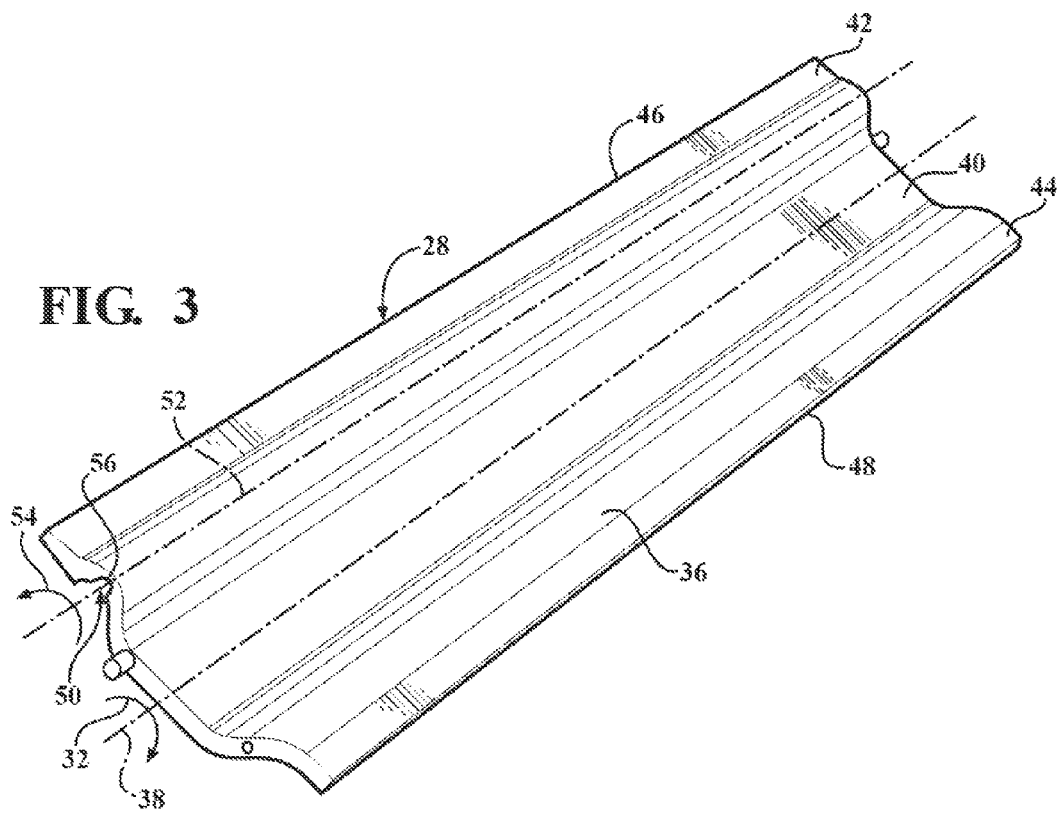
FIG. 3 is a schematic perspective view of a louver of the vehicle.
Figure 4:
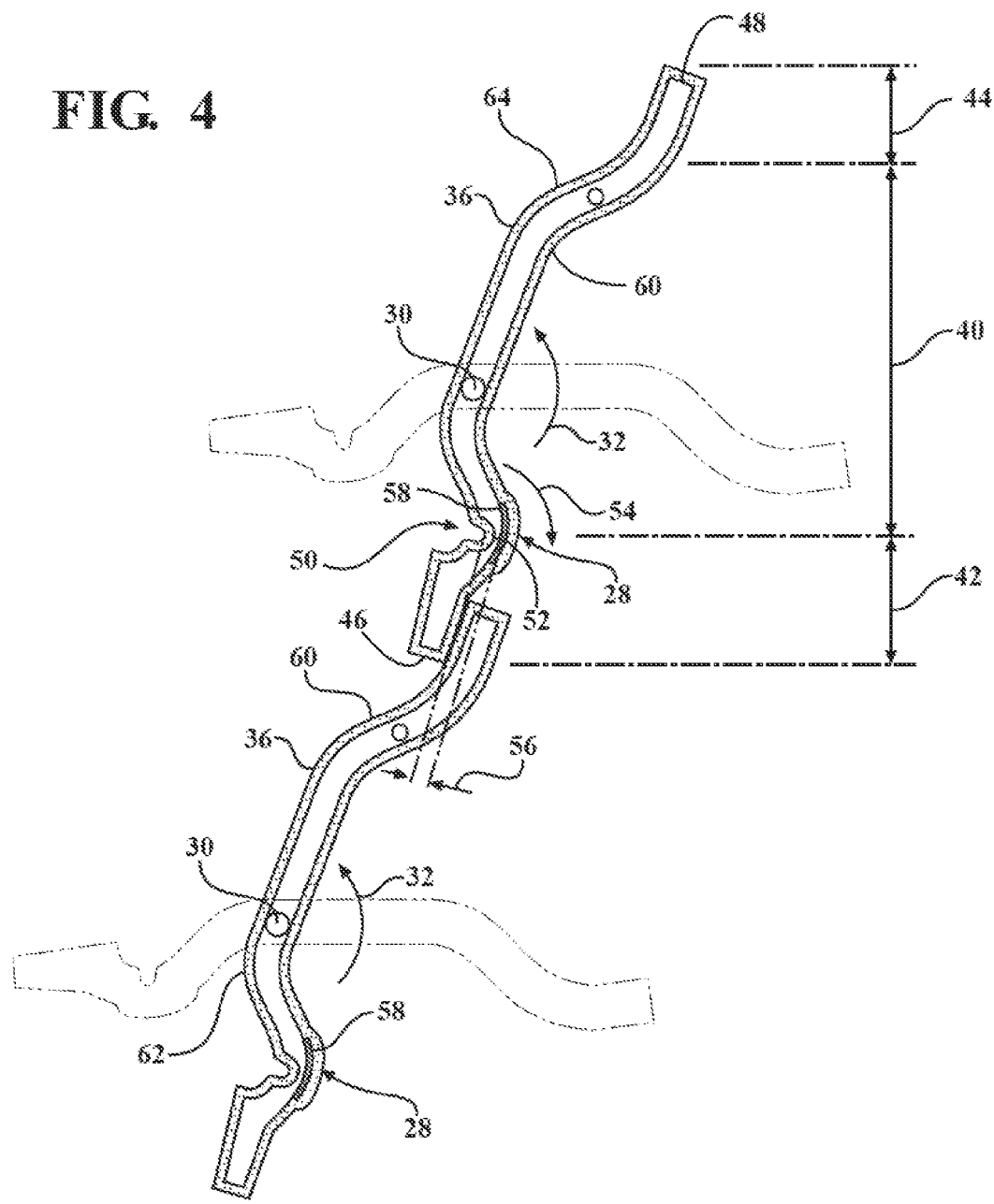
FIG. 4 is a schematic cross sectional view of the louver.

Referring also to FIGS. 3 and 4, the vehicle 20 includes at least one louver 28 coupled to the body 22. As best shown in FIG. 2, the louver 28 is rotatably moveable about a rotation axis 30. The louver 28 rotates about the rotation axis 30 between an open position (shown in phantom in FIGS. 2 and 4) and a closed position. The louver 28 rotates about the rotation axis 30 in a first direction 32 when moving from the closed position into the open position. When in the open position, the louver 28 allows airflow through the inlet 24. When in the closed position, the louver 28 blocks airflow through the inlet 24.

The vehicle 20 may further include an actuator (not shown). The actuator is mounted to the body 22, and is coupled to the louver 28. The actuator is configured for rotating the louver 28 between the open position and the closed position. The actuator may include, but is not limited to, an electric motor or some other device capable of moving the louver 28 between the open position and the closed position. The actuator additionally includes all linkages, gearing and/or connections necessary to move the louver 28 between the open position and the closed position. The specific type, style, size and/or configuration of the actuator is not pertinent to the description of the invention, and is therefore not described in detail herein.

As best shown in FIGS. 3 and 4, the louver 28 includes a panel 36. The panel 36 extends along a longitudinal axis 38, and includes a central portion 40, a first outer edge portion 42 and a second outer edge portion 44. The central portion 40, the first outer edge portion 42 and the second outer edge portion 44 extend along and parallel with the longitudinal axis 38 of the panel 36. The first outer edge portion 42 is disposed adjacent the central portion 40. The second outer edge portion 44 is also disposed adjacent the central portion 40, on an opposite side of the central portion 40 from the first outer edge portion 42. Accordingly, the second outer edge portion 44 is disposed opposite the first outer edge portion 42 across the central portion 40. The second outer edge portion 44 is substantially inflexible relative to the central portion 40 of the louver 28. Accordingly, the second outer edge portion 44 does not move substantially relative to the central portion 40.

As best shown in FIG. 4, the first outer edge portion 42 defines a first edge 46. The first edge 46 is disposed on a distal edge of the first outer edge portion 42, spaced from the central portion 40. The second outer edge portion 44 defines a second edge 48. The second edge 48 is disposed on a distal edge of the second outer edge portion 44, spaced from the central portion 40. As such, the first edge 46 and the second edge 48 define the outer longitudinal edges of the panel 36.

The louver 28 includes a hinge 50. The hinge 50 is disposed between the central portion 40 and the first outer edge portion 42. The hinge 50 pivotably interconnects the central portion 40 and the first outer edge portion 42 of the panel 36 for pivotable or bending movement about a pivot axis 52. The hinge 50 is configured for bending movement to allow the first outer edge portion 42 to move relative to the central portion 40 in a second direction 54 opposite the first direction 32 when the louver 28 rotates from the closed position to the open position. Allowing the first outer edge portion 42 to move in an opposite direction relative to the central portion 40 when moving from the closed position to the open position reduces an effective moment arm resisting the rotational movement of the louver 28 when the louver 28 is jammed and/or bound, for example, when covered with mud and/or dirt. By reducing the effective moment arm that resists the rotational movement of the louver 28, a force applied by the actuator to move the louver 28 has a greater effect, thereby allowing the actuator to break loose the louver 28.

The hinge 50 may be disposed at any location between the rotational axis and the first edge 46. Preferably however, the hinge 50 is disposed substantially midway between the rotation axis 30 and the first edge 46.

The hinge 50 may include, but is not limited to, a living hinge 50. The living hinge 50 is a joint designed with a reduced thickness portion 56 (best shown in FIG. 4) disposed between and connecting the central portion 40 and the first outer edge portion 42 that is meant to be repeatedly bent along the pivot axis 52 of the hinge 50. The reduced thickness portion 56 extends along a length of the louver 28 and interconnects the first outer edge portion 42 and the central portion 40 of the louver 28.

As best shown in FIG. 4, the louver 28 may include a substrate 58 backing for the hinge 50. As shown, the substrate 58 extends across the hinge 50 to couple the central portion 40 of the louver 28 to the first outer edge portion 42 of the louver 28. The substrate 58 reinforces the hinge 50 to prevent the hinge 50 from breaking The substrate 58 may include and be manufactured from any suitable material, including but not limited to a para-aramid synthetic fiber material such as Kevlar™, which is a registered trademark of E. I. duPont de Nemours and Company or their affiliates.

The louver 28 may include and be manufactured from, but is not limited to, a polymer material, such as a plastic. More specifically, the polymer may include, but is not limited to, a lubricated nylon. The lubricated nylon resists debris, such as mud and/or dirt, from sticking to the louver 28. However, it should be appreciated that the louver 28 may include and be manufactured from any other suitable material, such as a metal.

As best shown in FIG. 4, the louver 28 may include an anti-stick coating 60 disposed over an outer surface of the panel 36 and/or the louver 28. The anti-stick coating 60 resists debris, such as mud and/or dirt, from sticking to the louver 28. The anti-stick coating 60 may include any coating material that resists mud, dirt, and other debris from sticking to the outer surface of the louver 28. For example, the anti-stick coating 60 may include, but is not limited to a polyetrafluoroethylene (PTFE) coating such as Teflon, which is a registered trademark of E. I. duPont de Nemours and Company or their affiliates.

The vehicle 20 may include a plurality of louvers 28. For example, as shown in FIG. 2, the louver 28 includes a first louver 62, a second louver 64 and a third louver 66. The second louver 64 is disposed in parallel with and substantially below the first louver 62. The first outer edge portion 42 of the first louver 62 at least partially overlaps the second outer edge portion 44 of the second louver 64 when the first louver 62 and the second louver 64 are in the closed position.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
a body defining an inlet; and
a louver coupled to the body and rotatably moveable about a rotation axis between an open position allowing airflow through the inlet and a closed position blocking airflow through the inlet;
wherein the louver includes a central portion and a first outer edge portion, disposed adjacent the central portion;
wherein the first outer edge portion defines a first edge;
wherein the louver rotates about the rotation axis in a first direction when moving from the closed position into the open position; and
wherein the louver includes a hinge disposed between the central portion and the first outer edge portion, substantially midway between the rotation axis and the first edge, and configured for bending movement to allow the first outer edge to move relative to the central portion when moving from the closed position to the open position.

2. A vehicle as set forth in claim 1 wherein the hinge includes a living hinge.

3. A vehicle as set forth in claim 1 wherein the louver includes a polymer material.

4. A vehicle as set forth in claim 1 wherein the louver includes an anti-stick coating disposed over an outer surface of the louver.

5. A vehicle as set forth in claim 1 wherein the louver includes a second outer edge portion disposed opposite the first outer edge portion across the central portion.

6. A vehicle as set forth in claim 2 wherein the living hinge includes a reduced thickness portion extending along a length of the louver and interconnecting the first outer edge portion and the central portion of the louver.

7. A vehicle as set forth in claim 6 wherein the louver includes a substrate extending across the hinge to couple the central portion of the louver to the first outer edge portion of the louver.

8. A vehicle as set forth in claim 7 wherein the substrate includes Kevlar.

9. A vehicle as set forth in claim 3 wherein the polymer material includes a plastic.

10. A vehicle as set forth in claim 9 wherein the plastic includes a lubricated nylon.

11. A vehicle as set forth in claim 4 wherein the anti-stick coating includes a Teflon coating.

12. A vehicle as set forth in claim 5 wherein the second outer edge portion is substantially inflexible relative to the central portion of the louver.

13. A vehicle as set forth in claim 12 wherein the louver includes a first louver and a second louver disposed parallel with the first louver, wherein the second outer edge portion of the first louver at least partially overlaps the first outer edge portion of the second louver when the first louver and the second louver are in the closed position.

14. A louver for selectively opening and closing an inlet of a vehicle body, the louver comprising:
- a panel extending along a longitudinal axis and including a central portion, a first outer edge portion, and a second outer edge portion, wherein the first outer edge portion and the second outer edge portion are disposed opposite each other across the central portion;
- wherein the first outer edge portion defines a first edge, and the central portion defines a rotation axis for rotation thereabout in a first direction when moving from a closed position into an open position;
- an anti-stick coating disposed on an outer surface of the panel; and
- a hinge interconnecting the central portion and the first outer edge portion of the panel for bending movement about a pivot axis to allow the first outer edge portion to move relative to the central portion when moving from the closed position to the open position;
- wherein the hinge is disposed substantially midway between the rotation axis and the first edge.

15. A louver as set forth in claim 14 further including a hinge interconnecting the central portion and the first outer edge portion of the panel for bending movement about a pivot axis to allow the first outer edge portion to move relative to the central portion, wherein the second outer edge portion of the panel is substantially inflexible relative to the central portion of the panel.

16. A louver as set forth in claim 15 wherein the hinge includes a living hinge having a reduced thickness portion extending along a length of the panel and interconnecting the first outer edge portion and the central portion of the louver.

17. A louver as set forth in claim 15 wherein the panel includes and is manufactured from a lubricated nylon.

18. A louver as set forth in claim 15 wherein the anti-stick coating includes a Teflon coating.

19. A louver as set forth in claim 16 further comprising a substrate extending across the hinge to couple the central portion of the louver to the first outer edge portion of the louver, wherein the substrate includes Kevlar.

* * * * *